United States Patent [19]

Davis et al.

[11] Patent Number: 5,892,211

[45] Date of Patent: Apr. 6, 1999

[54] TRANSACTION SYSTEM COMPRISING A FIRST TRANSPORTABLE INTEGRATED CIRCUIT DEVICE, A TERMINAL, AND A SECURITY DEVICE

[75] Inventors: Terry L. Davis, Scottsdale, Ariz.; James A. Hart, Radnor, Pa.; Vincent A. Imperia, Tempe, Ariz.; Michael Love, Wilmington, Del.; Michael F. O'Malley, Glenside, Pa.; James F. Russell, Hockessin, Del.; John W. Sears, Peoria; Philip H. Trice, Phoenix, both of Ariz.

[73] Assignee: Electronic Payment Services, Inc., Wilmington, Del.

[21] Appl. No.: 848,940

[22] Filed: May 1, 1997

Related U.S. Application Data

[60] Continuation of Ser. No. 582,822, Jan. 4, 1996, abandoned, which is a division of Ser. No. 255,612, Jun. 9, 1994, Pat. No. 5,577,121.

[51] Int. Cl.$^6$ .............................. G06F 15/30; G06K 5/00
[52] U.S. Cl. ........................ 235/380; 235/379; 235/381; 902/26
[58] Field of Search ................................... 235/379, 380, 235/381; 902/1, 8, 26

[56] References Cited

U.S. PATENT DOCUMENTS

| | | | |
|---|---|---|---|
| Re. 33,571 | 4/1991 | Takahashi | 235/379 |
| 3,833,885 | 9/1974 | Gentile et al. | 340/152 R |
| 3,971,916 | 7/1976 | Moreno | 235/61.7 B |
| 4,011,433 | 3/1977 | Tateisi et al. | 235/61.7 B |
| 4,023,013 | 5/1977 | Kinker | 235/61.7 B |
| 4,068,213 | 1/1978 | Nakamura et al. | 340/149 A |
| 4,197,986 | 4/1980 | Nagata | 235/379 |
| 4,277,837 | 7/1981 | Stuckert | 235/380 |
| 4,361,754 | 11/1982 | Hoskinson et al. | 235/381 |
| 4,518,852 | 5/1985 | Stockburger et al. | 235/381 |
| 4,575,621 | 3/1986 | Dreifus | 235/380 |
| 4,590,365 | 5/1986 | Okada | 235/379 |
| 4,629,874 | 12/1986 | Pugsley et al. | 235/380 |
| 4,683,372 | 7/1987 | Matsumoto | 235/492 |
| 4,709,136 | 11/1987 | Watanabe | 235/380 |
| 4,709,137 | 11/1987 | Yoshida | 235/379 |
| 4,727,244 | 2/1988 | Nakano et al. | 235/380 |
| 4,746,788 | 5/1988 | Kawana | 235/380 |
| 4,802,218 | 1/1989 | Wright et al. | 380/23 |
| 4,804,825 | 2/1989 | Bitoh | 235/380 |
| 4,809,326 | 2/1989 | Shigenaga | 380/23 |
| 4,816,651 | 3/1989 | Ishording | 235/379 |
| 4,853,526 | 8/1989 | Effing | 235/492 |
| 4,855,578 | 8/1989 | Hirokawa et al. | 235/380 |
| 4,877,947 | 10/1989 | Mori | 235/381 |

(List continued on next page.)

FOREIGN PATENT DOCUMENTS 518808 12/1992 European Pat. Off. ................... 902/8

*Primary Examiner*—Donald T. Hajec
*Assistant Examiner*—Douglas X. Rodriguez
*Attorney, Agent, or Firm*—Panitch Schwarze Jacobs & Nadel, P.C.

[57] ABSTRACT

A transaction system having a first transportable integrated circuit (IC) device, a terminal, and a security device is disclosed. The first IC device includes a processor, memory, data stored in the memory, and an operating program stored in the memory. The terminal includes a reader/writer device, a processor, memory, and an operating program stored in the memory. The reader/writer device establishes communication with the first IC device whereby the processor of the first IC device is in communication with the terminal processor. The security device includes a processor, memory, data stored in the memory and an operating program stored in the memory. The security device communicates with the terminal so that the processor of the security device communicates with the terminal processor. Upon establishing communication with the first IC device, the terminal processor initiates and controls a series of operations by the security device processor utilizing the data and the operating program stored in the security device memory and data received from the first IC device for verification by the security device of the validity of the first IC device.

18 Claims, 9 Drawing Sheets

U.S. PATENT DOCUMENTS

| | | | |
|---|---|---|---|
| 4,885,788 | 12/1989 | Takaragi et al. | 235/382 |
| 4,900,903 | 2/1990 | Wright et al. | 235/380 |
| 4,906,828 | 3/1990 | Halpern | 235/379 |
| 4,959,788 | 9/1990 | Nagata et al. | 364/408 |
| 5,003,594 | 3/1991 | Shinagawa | 380/24 |
| 5,012,076 | 4/1991 | Yoshida | 235/379 |
| 5,033,021 | 7/1991 | Barakat | 364/900 |
| 5,036,461 | 7/1991 | Elliott et al. | 364/408 |
| 5,048,085 | 9/1991 | Abraham et al. | 380/23 |
| 5,097,115 | 3/1992 | Ogasawa et al. | 235/380 |
| 5,140,517 | 8/1992 | Nagata et al. | 364/408 |
| 5,144,115 | 9/1992 | Yoshida | 235/379 |
| 5,148,481 | 9/1992 | Abraham et al. | |
| 5,175,416 | 12/1992 | Mansvelt et al. | 235/379 |
| 5,191,193 | 3/1993 | Le Roux | 235/379 |
| 5,202,922 | 4/1993 | Iijima et al. | 380/23 |
| 5,227,612 | 7/1993 | Le Roux | 235/379 |
| 5,227,613 | 7/1993 | Takagi et al. | 380/21 |
| 5,227,988 | 7/1993 | Sasaki et al. | 364/709.01 |
| 5,239,166 | 8/1993 | Graves | 235/380 |
| 5,352,876 | 10/1994 | Watanabe et al. | 235/381 |
| 5,461,217 | 10/1995 | Claus | 902/1 |

TRANSACTION SYSTEM COMPRISING A FIRST TRANSPORTABLE INTEGRATED CIRCUIT DEVICE, A TERMINAL, AND A SECURITY DEVICE

This application is a continuation of Ser. No. 08/582,822 filed Jan. 4, 1996 now abandoned, which is a division of Ser. No. 08/255,612 filed Jun. 9, 1994 now U.S. Pat. No. 5,577,121.

FIELD OF THE INVENTION

The present invention relates generally to automated systems for performing transactions, such as financial transactions, using an integrated circuit device or card and, more particularly, to such transaction systems and methods of utilizing such transaction systems in a convenient and secure manner to permit such an integrated circuit device or card to be used in place of cash for the purchase of goods and/or services.

BACKGROUND OF THE INVENTION

Goods and/or services are generally purchased by consumers and others utilizing credit cards, debit cards and/or cash or its equivalents, i.e., checks, money orders and bank drafts. Credit and debit cards have been used only relatively recently for this purpose. Cash, both coin and currency, has been the primary medium of exchange for goods and services for centuries. During that entire time, problems such as theft, fraud, counterfeiting and short-changing have always been present.

The present invention comprises a transaction system for integrated circuit devices, more particularly, integrated circuit cards or "smart cards" which are employed in the transaction system as a substitute for cash (i.e., currency or coins). The present invention is superior to the use of cash in that the transfer of value from the card for the purchase of goods or services occurs in an automated manner without the need to produce, transport, store or secure currency or coins. With the transaction system of the present invention, the integrated circuit card is as simple and as easy to use as cash and yet all transactions are secure and self-validating.

With the present invention, financial institutions and other entities issue one or more integrated circuit cards to each system user or cardholder. A cardholder, utilizing a specialized automated terminal, loads "value" in the form of a cash or dollar balance onto his or her integrated circuit card by debiting an existing financial account, such as a checking, savings, or money market account, or by inserting cash into the terminal. Thereafter, the cardholder may use the integrated circuit card to purchase virtually any type of goods and/or services.

When a cardholder wishes to purchase goods and/or services, the integrated circuit card is inserted into a terminal at the point of purchase or sale of the desired goods and/or services. After an automatic verification and validation process takes place, the cardholder may purchase goods and/or services by having the cost of the goods and/or services deducted from the balance stored in the integrated circuit card. The card is then removed from the terminal for subsequent purchases and/or loading of value.

SUMMARY OF THE INVENTION

Briefly stated, the present invention comprises a method of conducting a transaction between an integrated circuit (IC) card and a transaction terminal which includes a security module. The method comprises establishing communication between the terminal and the IC card and separately generating a session key in the IC card using data stored in the IC card and a code associated with the particular IC card and in the security module using data stored in the security module and the code associated with the particular IC card. The session key generated by the IC card is used to encrypt data using an encryption algorithm to obtain a first result and the session key generated by the security module is used to encrypt the same data using the same encryption algorithm to obtain a second result. The first and second results are compared and the terminal is enabled to conduct the transaction only if the comparison establishes that the first result and the second result are identical.

In another aspect, the present invention further comprises generating a transaction signature by the IC card using transaction data and data stored in the IC card, generating a transaction signature by the security module using transaction data and data stored in the security module, and storing the transaction signatures generated by the IC card and the security module for creating an audit trail for the transaction.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF PREFERRED EMBODIMENT

Figure 1:
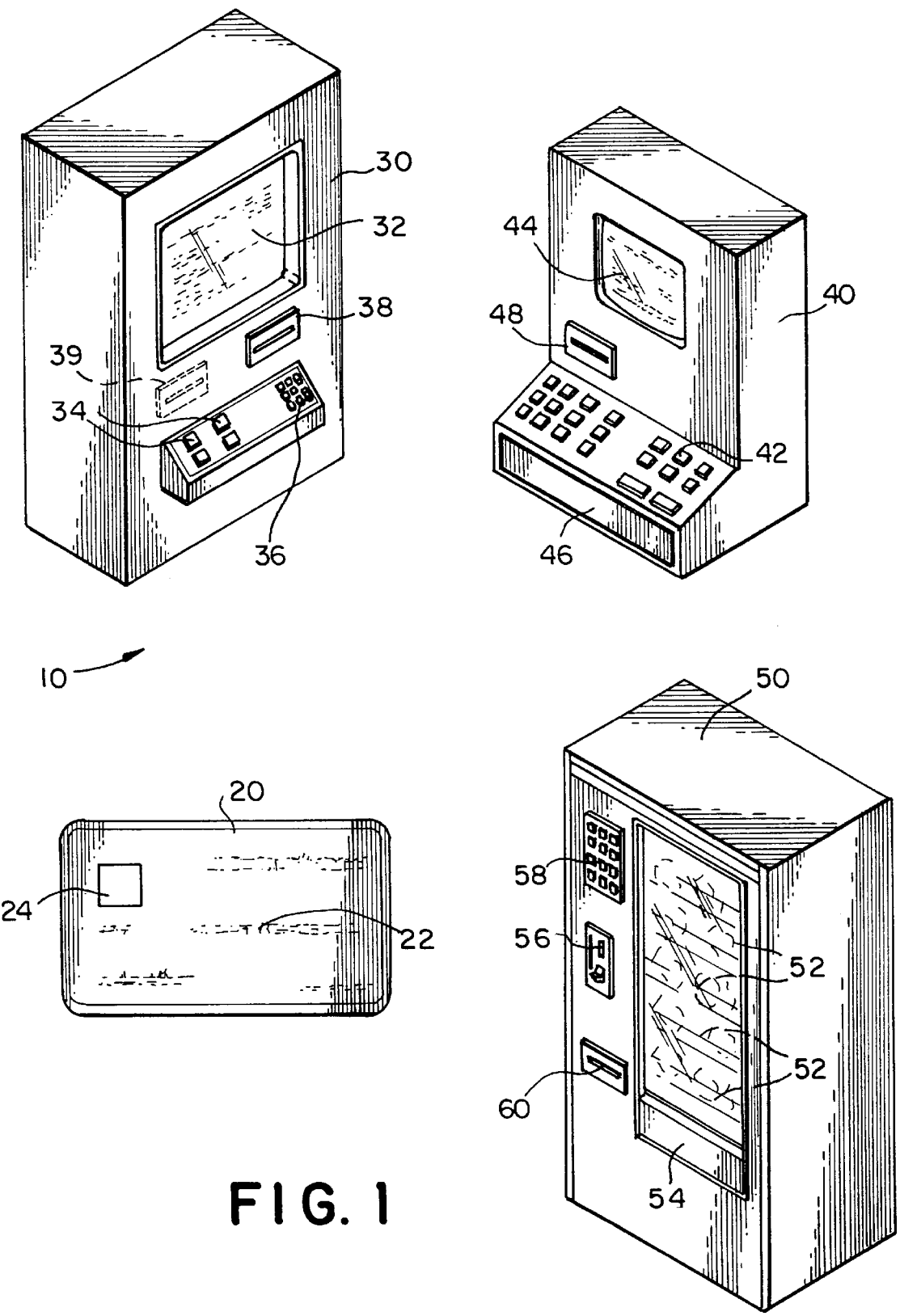
FIG. 1 is a functional schematic block diagram of a preferred embodiment of a transaction system in accordance with the present invention.

Referring to the drawings, wherein like numerals are used to indicate like elements throughout the several figures, there is shown in FIG. 1, some of the elements of a transaction system 10, in the presently preferred embodiment, a financial-based transaction system in accordance with the present invention. It should be appreciated by those skilled in the art that while a financial-based transaction system is shown and described, the present invention is not so limited and could encompass other, non-financial transaction systems including identification or access control systems (not shown).

As shown in FIG. 1, the principal element of the transaction system 10 is a portable integrated circuit (IC) device 20. In the present embodiment, the IC device 20 is comprised of a generally flat, rectangular, card-like substrate 22 having two principal surfaces which is preferably formed of a polymeric material but may be formed of some other material or of composite materials if desired. In the presently preferred embodiment, the substrate 22 has an overall size which is substantially the same as a standard or typical credit or debit card and is formed of substantially the same polymeric material. However, the particular size, shape and material composition of the substrate may vary if desired. One or both principal surfaces of the substrate 22 may include embossed or imprinted indicia such as the name of a financial entity which has issued the IC device 20 to a cardholder, the name of the cardholder to which the IC device 20 has been issued, an effective and/or expiration date of the IC device 20, an account number or other number used by the issuing entity or the like. A magnetic stripe (not shown) of the type generally well known and commonly used in credit cards, debit cards and the like, may also be incorporated into one or both principal surfaces of the substrate 22 in a manner well known in the art and any such magnetic stripe may include identification and other types of data stored in a manner well known in the art.

The substrate 22 in the present embodiment further includes an integrated circuit or chip 24 embedded therein. The integrated circuit 24 in the present embodiment includes a processor or a microprocessor, memory, including random access memory and a more permanent, or non-volatile form of memory such as an EPROM, EEPROM or other type of PROM, as well as a plurality of electrical contacts (not shown) conveniently located to facilitate the establishment of a direct mechanical type of electrical connection between the integrated circuit 24 and other elements of the transaction system 10 in a manner which will hereinafter be described. It will be appreciated that while mechanical contact type electrical connections are presently preferred, other non-mechanical contact technologies (not shown) may be alternatively employed for establishing communication for the transfer of signals and data between the integrated circuit 24 and other system elements. The non-volatile memory of the integrated circuit 24 also preferably includes a stored operating system program and certain stored data, further details of both of which will be hereinafter provided.

The IC device 20 as shown in FIG. 1 and as briefly described above is typical of a class or type of IC devices known as "smart cards" or "stored value cards". For purposes of clarity and brevity in the present description, the IC device 20 will hereinafter be referred to as a "stored value card" or "SVC". Further details of the physical structure of the SVC 20 and, more particularly, the integrated circuit 24 are not necessary for a complete understanding of the present invention and are not provided herein. Such details may be obtained from a variety of other sources including printed publications, issued U.S. and other patents, as well as from various manufacturers of stored value cards. In the presently preferred embodiment, the SVC 20 is a general purpose, reusable smart card available from Gemplus. Further, more specific details concerning the operation of the integrated circuit 24 and the method of use of the SVC 20 will hereinafter become apparent.

In the present transaction system 10, the SVC 20 is used as a substitute for cash (currency or coins) as a medium of exchange for a cardholder to obtain goods and/or services from a variety of sources. Thus, instead of or in addition to carrying cash, a cardholder carries the SVC 20 which includes, within its memory, at least one electronic purse which, when loaded with value in a manner which will hereinafter be described, may be conveniently used for the purchase of goods and/or services in place of cash. For purposes of the present description, the SVC 20 will be assumed to have a single electronic purse, but it should be understood that multiple identifiable electronic purses which may be used for particular applications may be provided.

FIG. 1 shows examples of three different types of automated terminals with which the SVC 20 may be employed. A load value terminal 30 is employed for the purpose of loading value into the electronic purse of the SVC 20. The load value terminal 30 as illustrated in FIG. 1, is generally similar in appearance to a standard automatic teller machine (ATM) of the kiosk or standalone type. In some applications, an existing ATM may be modified to function as a load value terminal. It will be appreciated by those skilled in the art that the load value terminal 30 may take on many other forms such as a countertop or tabletop terminal and, therefore, the particular embodiment of the load value terminal 30 shown in FIG. 1 should not be considered to be limiting.

The load value terminal 30 preferably includes a display device 32 which may be a cathode ray tube (CRT) as illustrated or, alternatively, may comprise a liquid crystal display (LCD), light emitting diode (LED) display, or any other type of display device employed for displaying or otherwise communicating information from the load value terminal 30 to a cardholder. The load value terminal 30 also includes input means for permitting a cardholder to provide information to the load value terminal 30. In the illustrated embodiment, the input means comprises a plurality of activity selection contacts or buttons 34 and a typical or standard ten-digit numerical keypad 36, both of a type well known to those skilled in the art. It will be appreciated that while the input means 34, 36 are illustrated as being individual buttons and/or a keypad on the front of the load value terminal 30, other types of input means, such as on-screen or touch screen input means or the like may be employed in the alternative.

The load value terminal 30 also includes an opening or slot 38 for receiving the SVC 20. The card receiving slot 38 is part of a reader/writer device (not shown in FIG. 1) which is employed in the present embodiment to encase and hold the SVC 20 within the terminal 30 and to establish and maintain communication, in the present embodiment, an electrical connection between the terminal 30 and the integrated circuit 24 of the SVC 20. The load value terminal 30, in some embodiments, may also include a currency receiver/reader 39, illustrated in phantom in FIG. 1. The currency receiver/reader 39 is adapted to receive, read and verify currency, or example, dollar bills, for use in loading value onto the SVC 20 in a manner which will hereinafter be described. Currency receiver/readers are well known in the art and need not be described in greater detail in order to understand the present invention.

In operation, the SVC 20 is inserted by a cardholder into the card receiving slot 38 of the load value terminal 30 and is engaged and held by the reader/writer device within the terminal 30. Once the electrical connection is established between the SVC 20 and the load value terminal 30 and the validity of the SVC 20 and the terminal 30 have been verified in a manner as described below to establish a "verified session" or "secure session", instructions for loading value onto the SVC 20 are provided to the cardholder on the display device 32. Using the selection buttons 34 and the numerical keypad 36 or other such input means, the cardholder selects the manner in which value, i.e., a selected cash balance, is to be loaded onto the SVC 20 and the total amount of value to be loaded. Value can be loaded by inserting currency into the currency receiver/reader 39 if the load value terminal 30 is so equipped. Alternatively, value can be loaded onto the SVC 20 by deducting a corresponding cash value from an established and identified account, such as a designated savings or checking account, of the cardholder in a manner which will hereinafter be described in greater detail. Typically, the load value terminal 30 is in communication with one or more financial entities with access to the designated account so the cardholder for authorization of the transfer of value to the SVC 20. Once the desired authorized amount of cash value has been loaded by the load value terminal 30 onto the SVC 20 (i.e., into the memory of the integral circuit 24), the SVC 20 is released by the terminal 30 and the cardholder removes the SVC 20 from the card receiving slot 38 and, thereafter, uses the SVC 20 to purchase goods and/or services as hereinafter described.

The SVC 20 may be used for the purchase of all types of goods and/or services in substantially the same way that cash or money is used. Thus, for example, the SVC 20 may be used by a cardholder to purchase groceries from a supermarket, to purchase food items or other items from a vending machine, to purchase food at a restaurant, to pay the fare for a bus ride or other transportation services, to pay tolls on a toll road, to pay for a telephone call or the like. The purchase of such goods and/or services is accomplished by transferring cash value which is stored in the memory of the integrated circuit 24, from the SVC 20 to a terminal having the capability of receiving and interfacing with the SVC 20 to facilitate the transfer of cash value corresponding to the value or cost of the goods and/or services purchased by a cardholder. FIG. 1 illustrates only two such terminals, a point of sale (POS) terminal 40 and a vending machine terminal 50. It will be appreciated by those skilled in the art that while only two specific types of terminals are illustrated in FIG. 1, many different types of terminals may be employed for receiving and transferring value from a SVC 20. Accordingly, the two typical terminals specifically illustrated and hereinafter discussed should not be considered to be a limitation upon the present invention.

The POS terminal 40 illustrated in FIG. 1 is similar in structure and appearance to a standard electronic cash register. More specifically, the POS terminal 40, which, in the present embodiment, preferably is computer controlled, includes a standard keyboard 42 having both numeric and specialized keys typical of the type employed in an electronic cash register. The POS terminal 40 may also include a fixed or hand-held scanner (not shown) such as a bar code scanner of the type in use with many electronic cash registers. Other means for the entry of pricing or other information may be employed in the POS terminal 40. A display screen 44, such as a CRT or other display device also typical of an electronic cash register is provided. In some applications, no display device is required. The POS terminal 40 may also include an openable drawer 46, such as a cash drawer or the like, which allows the terminal 40 to also effectively handle transactions involving cash, checks, credit cards or the like.

The POS terminal 40 also includes an opening or slot 48 for receiving the SVC 20 to facilitate transfer of value from the SVC 20 to the POS terminal 40. The card receiving slot 48 is part of a reader/writer device (not shown in FIG. 1) which is employed to engage and hold the SVC 20 within the POS terminal 40 and to establish and maintain communication, in the present embodiment, a mechanical type electrical connection, between the terminal 40 and the SVC 20. Preferably, the POS terminal 40 includes a processor or microprocessor (not shown) which uses a stored operating program to interact with the SVC 20 for the transfer of value in a manner hereinafter described. The POS terminal 40 as described may be employed in virtually any type of wholesale, retail or other facility in which virtually any type of goods (i.e., food, clothing, cleaning supplies, hardware, appliances, etc.) may be purchased or where any type of services (i.e., restaurant services, video rentals, dry cleaning services, car wash services, etc.) may be purchased. Typically, such a POS terminal 40 will be located in the same place in which a cash register is located, typically at or near an entrance or exit to a facility but the POS terminal 40 could be at some other location, for example, within a particular area or department of a retail or other facility, if desired.

In use, when a holder of the SVC 20 desires to pay for selected goods and/or services, typically when leaving a retail or other facility, a clerk or other person associated with the facility enters the cost of the goods or services as well as any other requisite information (i.e., department or item codes) into the POS terminal 40 using the entry keys of the keyboard 42, a scanner (not shown), or any other type of data entry device. Once the cost of the goods and/or services and/or other requisite information has been entered and is totalled, the SVC 20 is inserted into the card slot 48 on the POS terminal 40. It will be appreciated that while the card receiving slot 48 in the embodiment illustrated in FIG. 1 is shown as being incorporated in the front surface of the POS terminal 40, the card slot 48 could be in some other location such as on the customer side of the POS terminal 40 or at a remote location, such as on the side of a check-out counter associated with the POS terminal 40. In some applications, the SVC 20 may be inserted into the card slot 48 before or during the time that the cost and/or other information is entered. In some applications, the cardholder may enter the cost and/or other information into the POS terminal 40. Regardless of where the card receiving slot 48 is located and when the SVC 20 is inserted, when the SVC 20 is inserted into the card receiving slot 48, a verification process is performed (described in detail hereinafter) to establish a secure session between the SVC 20 and the POS terminal 40 and the total value of the purchased goods and/or services is thereafter deducted from the available cash value balance stored within the memory of the SVC 20 and the transaction is logged or stored within the memory of the POS terminal 40. Once the transfer of value from the SVC 20 to the POS terminal 40 has been completed, the SVC 20 is released by the POS terminal 40 and is removed by the cardholder or facility clerk from the card receiving a slot 48 thereby completing the purchase of the goods and/or services. Of course, the amount transferred from the SVC 20 for the goods and/or services being purchased must be less than or equal to the total amount of cash value stored within the memory of the SVC 20.

The vending machine terminal 50 comprises essentially a standard standalone-type vending machine having a housing containing a plurality of individual items 52 which may be dispensed through a dispensing opening 54 proximate the lower portion of the vending machine terminal 50. The vending machine terminal 50 may also include a standard coin and/or bill receiving device 56 to permit coins or currency to be used for the purchase of selected items 52. A plurality of selector buttons 58 are provided to permit a purchaser to select, typically using an alphanumeric coding scheme, which one of the various items 52 is to be dispensed. Finally, the vending machine terminal 50 includes a card receiving slot 60 which is employed or receiving the SVC 20. The card receiving slot 60 is part of a reader/writer device (not shown in FIG. 1) which is employed to engage and hold the SVC 20 within the vending machine terminal 50 and to establish and maintain communication, in the present embodiment, a mechanical type electrical connection, between the vending machine terminal 50 and the SVC 20. Preferably, the vending machine terminal 50 includes a processor or microprocessor which uses an operating program stored in memory to interact with the SVC 20 for the transfer of value to enable the dispensing of one or more items 52.

In operation, to obtain a selected item 52 from a vending machine terminal 50, a holder of the SVC 20 inserts the SVC 20 into the card receiving slot 60. After a verification procedure has been completed (hereinafter described) to establish a secure session, the selection buttons 58 are enabled to permit the cardholder to select one or more items 52 to be dispensed, consistent with the cash value available within the SVC 20. As an item 52 is dispensed, the cost of the dispensed item is deducted from the available balance of the cash value stored within the memory of the SVC 20 and the transaction is logged or stored within the memory of the vending machine terminal 50. Thereafter, the SVC 20 is released and the cardholder may remove the dispensed item through the dispensing opening 54 and may remove the SVC 20 from the card receiving slot 60.

Structures similar to the two described terminals 40, 50 are used and similar procedures are employed when the SVC 20 is used for the purchase of other types of goods and/or services with other types of terminals (not shown) Each such terminal includes some type of card receiving slot or other device employed for establishing communication between the SVC 20 and the terminal and some type of computer controlled means for verification or authentication purposes and for transferring cash value from the memory of the SVC 20 to the applicable terminal corresponding to the cost of the goods and/or services being purchased by a cardholder. A complete description of the structure and operation of such additional terminals is not believed to be necessary for a complete understanding of the present invention and, therefore, will not be presented. It should be appreciated by those skilled in the art that the present invention is not limited to the terminals 40, 50 specifically discussed above and shown on FIG. 1.

Figure 2:
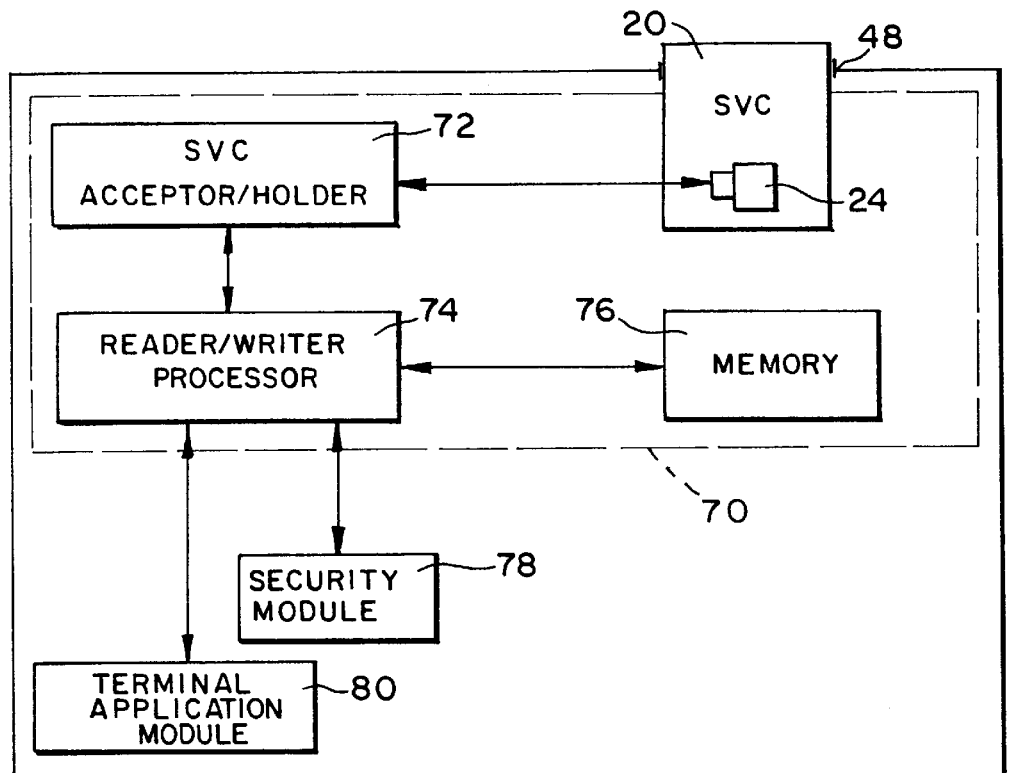
FIG. 2 is a more detailed functional schematic block diagram of a portion of a POS terminal of FIG. 1.

FIG. 2 is a more detailed functional schematic block diagram of a portion of the POS terminal 40, illustrating in greater detail the functional hardware and firmware elements of the POS terminal 40 employed for interfacing with the SVC 20 and for verification purposes. It will be appreciated that, while for purposes of describing the present embodiment, the functional aspects of the POS terminal 40 are illustrated, the same or essentially the same structural and operational elements are present in other types of terminals with which the SVC 20 interfaces or the transfer of value. In addition, it will be appreciated that such other terminals with which the SVC 20 interfaces for the transfer of value also function in substantially the same manner as will hereinafter be described with respect to the pertinent portions of the POS terminal 40. Thus, the POS terminal 40 has been selected merely for the purpose of illustrating the verification process and is not considered to be a limitation on the present invention.

The POS terminal 40 includes a reader/writer device 70 comprised of the hardware and software necessary to communicate with and to read from and write to a SVC 20, more particularly, the memory within the integrated circuit 24. The reader/writer device 70 includes a SVC acceptor/holder 72, a processor 74, and, in the present embodiment, its own memory 76, although it may share a memory with another component. The SVC acceptor/holder 72 includes the card slot 48 of the POS terminal 40 and functions to engage and hold the SVC 20 which is inserted by a cardholder or other person through the card slot 48. The SVC acceptor/holder 72 continues to hold the SVC 20 in position until the transaction between the SVC 20 and the POS terminal 40 has been completed. Hardware devices employed for the purpose of receiving and holding smart cards, credit cards, and other types of cards in this manner are well known in the art and are available from several manufacturers. Complete details of the structure and operation of the SVC acceptor/holder 72 are not necessary for complete understanding of the present invention and, therefore, are not set forth herein. Such details are available from the manufacturers of such card acceptor/holder devices such as Danyl Corporation or VeriFone Inc.

The SVC acceptor/holder 72, in addition to engaging and holding the SVC 20 within the POS terminal 40, in the present embodiment, includes contact means (not shown) for engaging the contacts associated with the integrated circuit 24 of the SVC 20 to establish a direct mechanical contact electrical connection with the SVC 20, more particularly, with the integrated circuit 24. The contact means (not shown) of the SVC acceptor/holder 72 are suitably positioned so that when the SVC 20 is properly engaged and held by the SVC acceptor/holder 72, the contact means are properly aligned with contacts (not shown) of the integrated circuit 24 on the SVC 20 to provide the requisite electrical connection. Contact means of this type are also well known in the art and, therefore, a complete description of the structure and operation of such contact means is not necessary for an understanding of the present invention. In addition, it should be appreciated that while a direct mechanical type electrical connection is established in the present embodiment, other contact or contactless methods of establishing a communication link or path between the integrated circuit 24 of the SVC 20 and the terminal could be employed if desired.

The SVC acceptor/holder 72 communicates with the reader/writer processor 74 thereby effectively placing the SVC integrated circuit 24 in communication with the reader/writer processor 74. The reader/writer processor 74 also communicates with the memory 76. The memory 76 includes both random access memory as well as non-volatile read-only memory such as an EEPROM or the like. The memory 76 is employed by the reader/writer 70 for the storage of an operating program as well as specific transaction logging, transaction signature and other data of a type which will hereinafter be described in greater detail. The reader/writer processor 74 functions to control the establishment of a secure session between the SVC 20 and the POS terminal 40 in a manner which will hereinafter be described in greater detail.

A security module 78 also communicates with the reader/writer processor 74 for cooperating with the reader/writer processor 74 in establishing a secure session with the SVC 20. The security module 78 is preferably located within the POS terminal 40 and may be physically positioned within the reader/writer device 70 if desired. The security module 78 could be at a location remote from the POS terminal 40 in some applications. In the presently preferred embodiment, the security module 78 is formed of at least a portion of an integrated circuit (IC) card, more particularly, a Gemplus MC0S24K card. It will be recognized that the security module 78 could be implemented with other technologies, particularly if remotely located. The requisite portion of the IC card which forms the security module 78 includes at least a portion of the substrate and the integrated circuit. The IC card used to form the security module 78 may be physically located within a holder device (not shown) which mechanically engages the contacts of the security module IC card in order to provide an electrical connection between the contacts of the security module IC card and the reader/writer processor 74. In order to simplify the following description of the operation of the POS terminal 40 in establishing a secure session, the security module IC card and/or integrated circuit will be referred to merely as the security module 78.

As with the SVC 20, in the present embodiment, the security module 78 includes a processor or microprocessor, memory, including random access memory, and a more permanent or non-volatile form of memory such as an EPROM, EEPROM, or other type of PROM as well as the requisite contacts for establishing the electrical connection with the reader/writer processor 74. The memory also includes an operating system program and certain stored data hereinafter described in greater detail.

As discussed above, in order to use the SVC 20 to conduct a financial or other transaction with a terminal such as the POS terminal 40, it is first necessary to establish a secure session between the SVC 20 and the terminal 40. A secure session is established after an automatic dual challenge procedure (hereinafter described) between the SVC 20 and the security module 78 under the direction and control of the reader/writer processor 74 successfully verifies that both the SVC 20 and the POS terminal 40 (including the security module 78) are mutually validated to perform interactions involving the transfer of value. Establishing a secure session includes establishing a one time session key which is maintained only in the SVC 20 and in the security module 78 and is used for encrypting certain information passing between the SVC 20 and the POS terminal 40 only for the remainder of the particular secure session, usually one complete financial or other transaction. Of course, the value transferred is still limited by the amount of cash value stored in the memory of the SVC 20.

A terminal application module 80 is included as an interface between the reader/writer processor 74 and the remainder of the POS terminal 40. Essentially, the remainder of the POS terminal 40 is a standard electronic cash register, described generally above with respect to FIG. 1, or some other type of standard electronic device used for entering and totaling the cost of the goods and/or services being purchased by the cardholder. The terminal application module 80 provides a convenient interface for passing the total cost information from the standard portion of the POS terminal 40 to the reader/writer processor 74. The reader/writer processor 74, in turn, effectively deducts the total cash value of the transaction from the balance in memory of the SVC 20 and effectively transfers the corresponding cash value to the terminal 40 in a manner which will hereinafter be described in greater detail.

Once the value has been transferred from the SVC 20, the reader/writer processor 74 also obtains from the SVC 20 a transaction signature which is stored in the reader/writer device memory 76 to establish a secure audit trail or log for later verification of each transaction between the SVC 20 and the POS terminal 40. A separate transaction signature is also obtained from the security module 78 for each such transaction and is also stored in the reader/writer device memory 76 also to establish a secure audit trail or log for later verification of each transaction between an SVC 20 and the POS terminal 40. Both of the transaction signatures are stored in the memory 76 at locations which are related to a transaction log stored in the memory 76 as a result of the corresponding transfer of value. Once the transaction signatures have been received and stored, the reader/writer processor 74 signals the SVC acceptor/holder 72 to power down the SVC 20 and release it thereby ending the secure session and permitting a cardholder or other person to remove the SVC 20 from the card slot 48.

As suggested above, a transaction system 10 of the type described for transferring value in exchange for goods and services must be completely trustworthy in order to function effectively. Thus, all transactions that occur within such a transaction system 10 must be secure and complete detailed audit trails of all such transactions must be maintained by the system. In the present embodiment of the transaction system 10, the integrated circuit 24 of the SVC 20 and the integrated circuit within security module 78 have inherent security features that prevent observers and would-be thieves from determining precisely what steps are being performed within these components. For example, the processors of both the SVC 20 and the security module 78 are passive and subservient to the reader/writer processor 74 and, therefore, only function under program instructions from the reader/writer microprocessor 74. In addition, in the present embodiment, all interaction between the SVC 20 and a reader/writer processor 74 begins with a dual-challenge, cross-verification procedure (hereinafter described) to establish a secure session as a result of positive confirmation that both the SVC 20 and the terminal (security module 78) are validated for the performance of a financial or other transaction. The secure session is established utilizing data stored within the memory of the SVC 20 and the memory of the security module 78.

In the presently preferred embodiment, all encrypted data is preferably encrypted utilizing a standard data encryption algorithm in accordance with a well known Data Encryption Standard (DES). The data encryption algorithm allows plain text or unencrypted data to be converted into unreadable cipher text or encrypted data using one or more cyptographic keys. The process of converting plain text data into encrypted data is called encryption and the reverse process is called decryption. DES cryptographic keys are eight-byte entities of which at least the least significant seven bits of each byte is used, resulting in a fifty-six bit key. The standard DES algorithm is a complex process that shifts and merges individual bits of the plain text data as directed by the bits of the key being used. The result of the encryption process is a binary data block that bears no discernible relationship to the original unencrypted data and can only be decrypted using the DES algorithm and the cryptographic keys used in the encryption process. It will be appreciated that in some instances, it may be advantageous to use only a portion of the encrypted data.

A complete understanding of the encryption process and, particularly, the DES algorithm is not necessary for an understanding of the present invention. Essentially, the present invention is operable with virtually any type of DES algorithm, public key or any other cryptographic algorithm or essentially any cryptographic keys. All that is necessary for an understanding of the present embodiment is a knowledge that encryption takes place utilizing certain identified keys and utilizing a standard DES or other cryptographic algorithm.

A secure session is establishes in the manner described below by separate encryption of certain data by both the SVC 20 and the security module 78 utilizing, in the present embodiment, a standard DES algorithm and certain encryption keys which are stored in the SVC 20 and in the security module 78. All or selected portions of the separately encrypted data is then separately compared for confirmation purposes. In order to provide enhanced security, the present embodiment of the transaction system 10 utilizes a multiple encryption procedure. A first set of DES master keys are the first or basic keys used for the encryption process. The master keys are never stored within either the SVC 20 or the security module 78. Instead, the master keys are maintained by a card issuing entity in a highly secure location. The master keys themselves are used to generate a plurality of control keys utilizing a DES encryption algorithm. Because the security module 78 is in a relatively secure environment, some of the control keys are stored within the memory of the security module 78. However, in the SVC 20, the control keys are used with the DES algorithm and an identification code or number, more particularly, in the present embodiment, a serial number, assigned to each individual SVC 20 to provide derived keys which are stored within the SVC 20. In this manner, each individual SVC 20 has its own set of derived keys and the derived keys stored in each SVC are different from the derived keys stored in every other SVC. A derived key selected by the reader/writer processor 74 is used by the SVC along with other data to create and verify a non-repeating, non-reusable session key which is then used for encrypting certain transaction data and information passing between the SVC 20 and the POS terminal 40. In the presently preferred embodiment of the invention, there are several categories of derived keys which are stored within the SVC 20 including verification keys, authorization keys, etc. In addition, a plurality of each category of the derived keys is stored within the SVC 20. Correspondingly, a plurality of different categories of control keys and derived keys are stored within the security module 78 with a corresponding plurality of some categories of the keys being stored. To further enhance security, the reader/writer processor 74 selects which of the keys in each category is to be used for each secure session, the selection being made on a random or rotating basis or any other desired basis.

In order to facilitate the establishment of a secure session, as well as the generating of the above-described transaction signatures, both the SVC 20 and the security module 78 contain additional stored data. In the preferred embodiment, the following data is preferably stored within the memory of the SVC 20:

(1) the one-of-a-kind identification number or serial number which is assigned to each SVC 20;

(2) a transaction count, a number which starts at zero and is incremented each time a transaction is conducted using the SVC 20;

(3) a derived password or number; and (4) an identification number (different from the serial number) associated with a financial institution or other entity which issues the SVC.

In addition to the control and derived keys, in the present embodiment, the security module 78 includes data stored in its memory as follows:

(1) a transaction count which begins at zero and is incremented every time that the security module 78 is employed for establishing a secure session;

(2) a password or number;

(3) a hash control value which maintains certain data from all transactions with which the security module 78 is employed; and (4) data and program instructions for generating a random number on demand.

Figure 5:
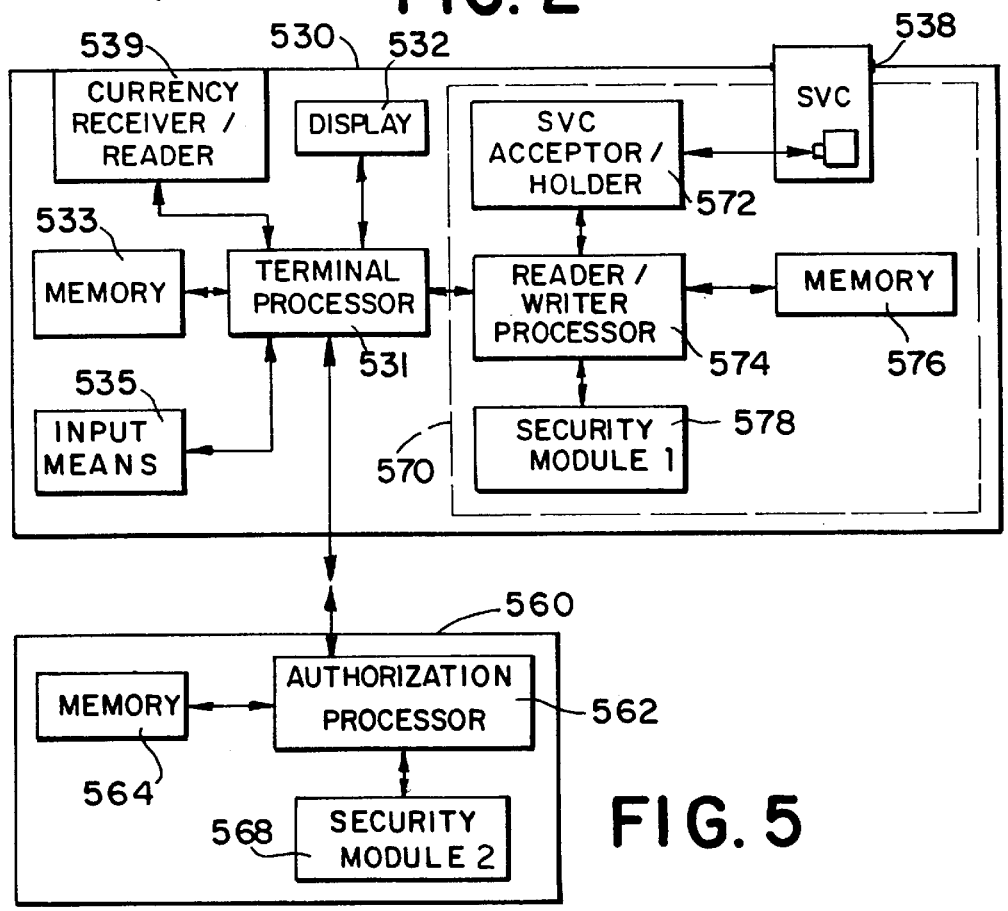
FIG. 5 is a more detailed functional schematic block diagram of a portion of a load value terminal of FIG. 1.
Figure 3A:
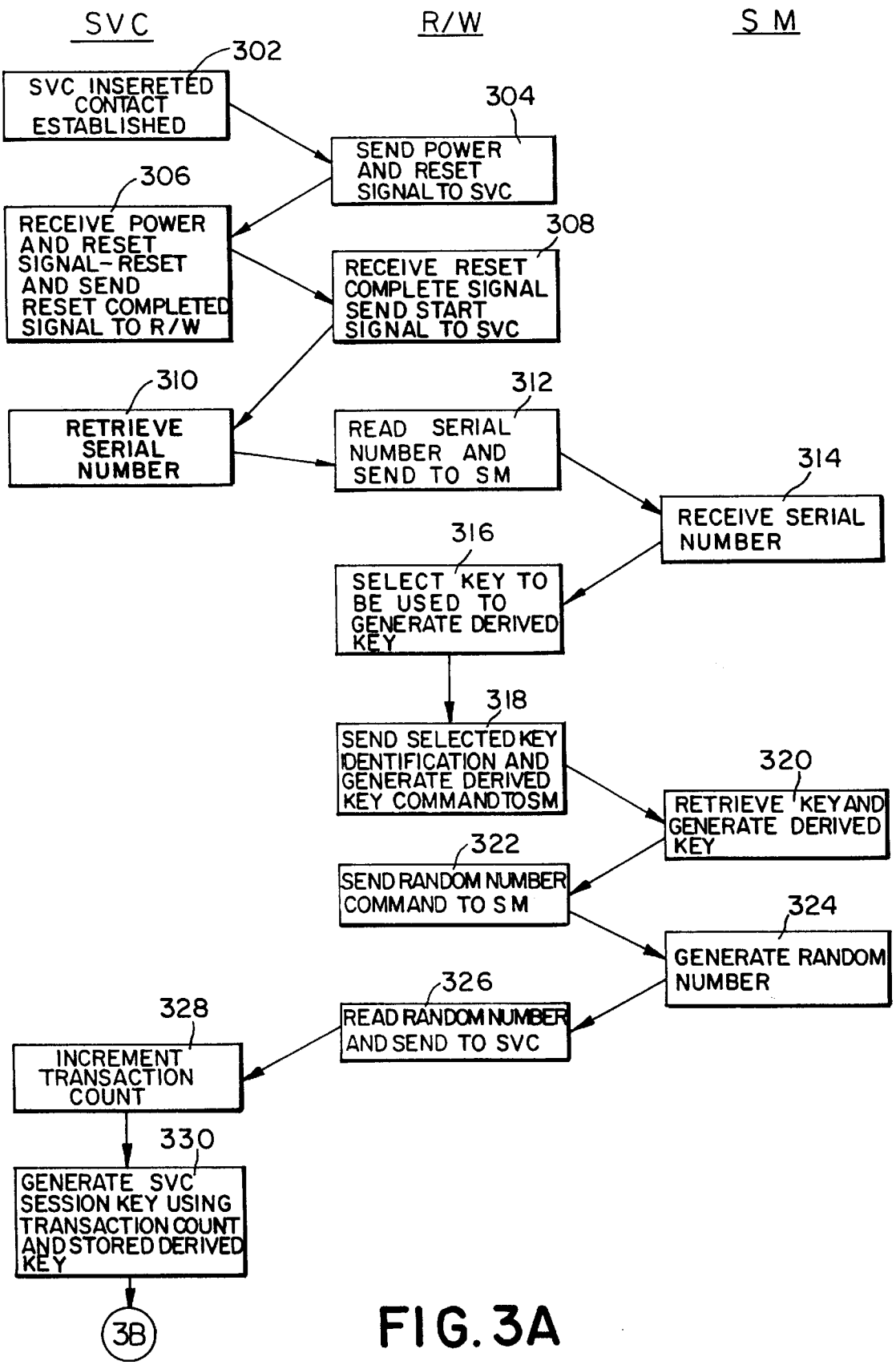
FIGS. 3A and 3B are a flow diagram of the preferred method employed for establishing a secure session between an integrated circuit card and a terminal in accordance with the present invention.
Figure 3B:
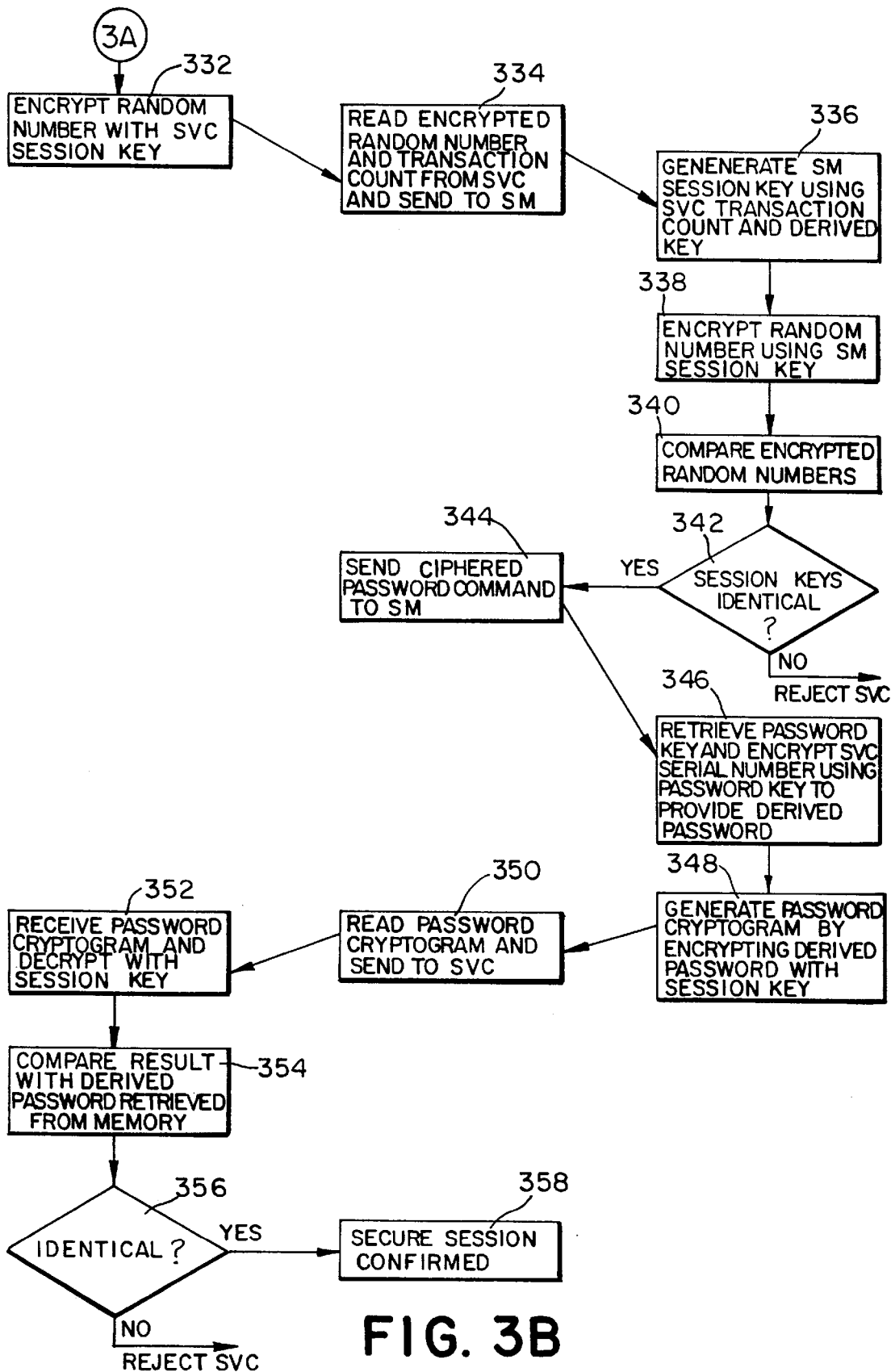

FIGS. 3A and 3B together are a basic flow diagram of the preferred procedure or method employed in the present embodiment for establishing a secure session between a SVC 20 and a terminal, in the described embodiment, a POS terminal 40. The same or a similar or related method may be employed for establishing a secure session between the SVC 20 and some other terminal, such as a load value terminal 30, or between two other subsystems, such as a load value terminal 30 and an authorization system (FIG. 5). On FIGS. 3A and 3B, activities which take place in the SVC 20 are shown in the left column, activities which take place in the reader/writer microprocessor (R/W) 74 are shown in the center column, and activities which take place in the security module 78 (SM) are shown in the right column. Every transaction begins with the insertion of the SVC 20 into the card slot 48 and with the establishment of the electrical connection between the SVC acceptor/holder 72 and the integrated circuit 24 of the SVC 20 as shown at block 302. Although it should be understood that all of the steps hereinafter described actually take place between the integrated circuit 24 and, particularly the processor and memory of the integrated circuit on the SVC 20, for the sake of brevity in describing the process, these components will be referred to generally as the SVC. Once the electrical connection with the SVC 20 has been established, an appropriate signal is sent to the reader/writer processor 74 (hereinafter referred to as the "reader/writer" for brevity). At block 304 the reader/writer sends power and a reset signal to the SVC 20. The SVC 20 receives the power and reset signal at block 306, powers up, resets itself and sends a reset completed signal to the reader/writer. After receiving the reset complete signal at block 308, the reader/writer sends a start or begin signal to the SVC 20 to commence the establishment of a secure session. After receiving the start signal, the SVC retrieves from its memory its assigned identification or serial number at block 310 which is not encrypted. At block 312 the reader/writer reads the unencrypted serial number from the SVC 20 and sends the serial number to the security module 78.

At block 314, the security module, which is already connected to and communicating with the reader/writer processor 74, receives the serial number of the SVC 20 and confirms receipt to the reader/writer. The reader/writer now selects which of the plurality of keys of each category of keys stored within the SVC 20 and the security module 78 will be used in the present secure session. In the presently preferred embodiment, as discussed briefly above, preferably at least three different keys for each category of keys are stored in both the SVC 20 and the security module 78. If desired, a lesser or greater number of each category of keys could be stored. Preferably, the reader/writer makes the selection of the particular key number to be used for each secure session on a random basis. However, some other basis could be used for selecting the key number if desired. For example, the key numbers could be selected sequentially in a predetermined rotation i.e., one, then two, then three, then one; or, one, then three, then two, then one. The precise manner in which the key numbers used for each secure session are selected by the reader/writer should not be considered to be a limitation on the present invention. At block 318, the reader/writer sends the selected key identification (i.e., key number) to the security module along with a command for the security module to generate a derived key. The reader/writer also sends the selected key identification information to the SVC (not shown).

The security module receives the selected key identification information and retrieves from its memory the selected control verification key at block 320. Using the previously received serial number of the SVC 20 and the selected control verification key, the security module, using the DES algorithm, generates a derived verification key. The security module also confirms to the reader/writer that the derived verification key has been generated and the reader/writer responds at block 322 by sending a command to the security module to generate a random number.

At block 324, the security module, utilizing the stored program and data employed for generating a random number, generates a random number. The reader/writer reads the clear text (unencrypted) random number generated by the security module 78 and sends the random number to the SVC in block 326.

At block 328, the SVC 20 increments its transaction counter and at block 330, the SVC generates its own SVC session key by retrieving from its memory the derived verification key selected by the reader/writer and by encrypting its own transaction count with the retrieved derived verification key using the DES algorithm. The SVC session key is maintained exclusively within the SVC 20 and is not sent to or read by the reader/writer. At block 332, the SVC 20 encrypts the random number received from the reader/writer with the SVC session key generated in block 330. The resulting encrypted random number is referred to as a response certificate.

At block 334, the reader/writer reads the response certificate from the SVC 20 and sends the response certificate to the security module. Upon receiving the response certificate at block 336, the security module uses the previously received transaction count and the derived verification key from block 320 to generate a security module session key again using the DES algorithm at block 336. The generated security module session key is thus associated with the particular session since it is generated utilizing a transaction count and is also associated with the particular SVC and since it is generated indirectly using the SVC serial number. The security module session key is maintained exclusively within the memory co the security module in order to provide enhanced system security. The security module, at block 338, encrypts the random number generated in block 324 with the security module session key generated in block 336 and at block 340 compares the response certificate from the SVC (block 32) to the random number encrypted in block 338 by the security module 78 using the security module session key. If the response certificate and the encrypted random number from the block 338 are identical, this means that the session key generated by the security module 78 is identical to the session key generated by the SVC 20. If the two session keys are identical, i.e., there is a common session key (block 342), the security module has effectively verified that the SVC 20 inserted within the POS terminal 40 is, in fact, a validated SVC. If the comparison is unfavorable indicating that the security module session key is not identical to the SVC session key, the SVC 20 is rejected and the transaction does not proceed further.

If the session keys are identical as established in block 342, an appropriate confirmation signal is provided to the reader/writer. The reader/writer then commands the security module to generate a ciphered password at block 344. In response, the security module retrieves from its memory a control password key and encrypts the SVC serial number with the control password key using the DES algorithm at block 346 to produce a derived password. The derived password is then encrypted by the security module at block 348 using the session key and the DES algorithm to establish a password cryptogram. The reader/writer reads the password cryptogram from the security module 78 at block 350 and sends the password cryptogram to the SVC 20.

The SVC 20 receives the password cryptogram at block 352 and decrypts the password cryptogram with the session key utilizing the DES algorithm. The result is compared with a derived a password which the SVC retrieves from its memory at block 354. If the result is identical to the derived password stored in the SVC (block 356), the security module 78 and correspondingly the POS terminal 40 are verified and the establishment of a secure session is confirmed to the reader/writer at block 358. If the results of the comparison show that the decrypted cryptogram is not identical to the retrieved derived password, the security module 78 is not verified. In this case, the SVC 20 rejects any further processing of the transaction.

The foregoing procedure for establishing a secure session is completed automatically and essentially immediately (i.e., real time or close to real time) with no interaction between the POS terminal 40 and the cardholder. All that is required to initiate the establishment of a secure session is the insertion of the SVC 20 into the card slot 48 of the POS terminal 40. Assuming that the secure session is established, the POS terminal 40 is then enabled through the terminal application module 80 to execute the desired value transfer with the SVC 20 in the manner discussed briefly above.

Figure 3C:
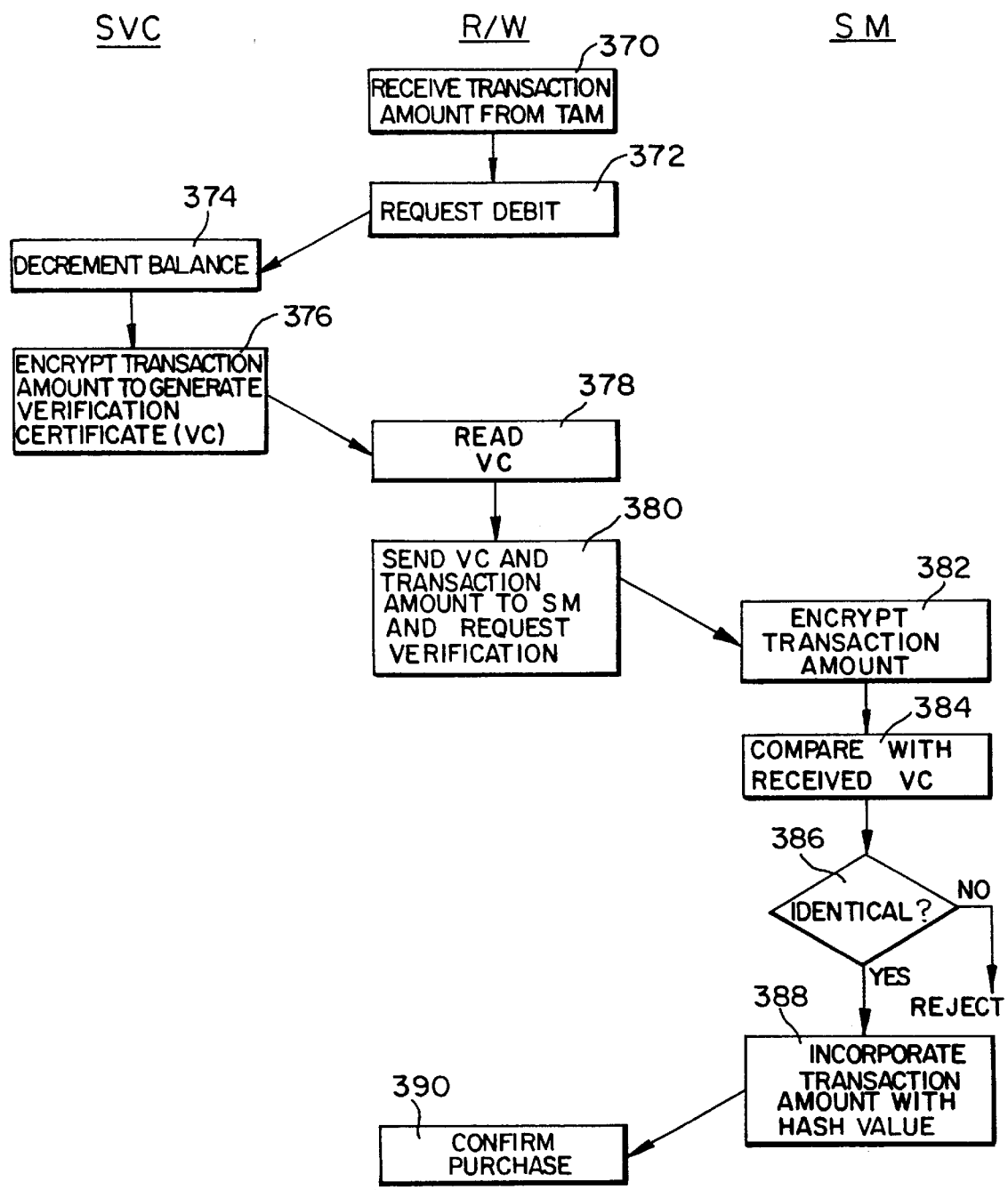
FIG. 3C is a flow diagram of the preferred method of transferring value from an integrated circuit card to a POS terminal.

FIG. 3C is a flow diagram illustrating the preferred method of transferring value from the SVC 20 to the POS terminal 40. At block 370, the reader/writer processor 74 receives the transaction amount from the terminal application module 80. The reader/writer then requests that the SVC 20 be debited at block 372. The SVC 20 then decrements the balance of the value stored within its memory at block 374 and at block 376, generates a verification certificate (VC) by encrypting the transaction amount with the session key using the DES algorithm.

At block 378, the reader/writer reads the verification certificate and at block 380 sends the verification certificate along with the transaction amount to the security module 78 and requests verification from the security module. The security module, at block 382, encrypts the transaction amount with the session key using the DES algorithm. At block 384, the encrypted result is compared with the received verification certificate. If the result is not identical to the received verification certificate, the transfer of value from the SVC 20 to the terminal 40 is rejected at block 386. If the comparison shows that the encrypted result is identical to the received verification certificate, the security module calculates a new hash control value by effectively incorporating the transaction amount with the existing hash control, value stored in the memory of the security module 78 at block 388. The security module sends a confirmation signal to the reader/writer at block 390 which, in turn, sends a confirmation of the completed purchase to the terminal application module 80.

At this point, the transfer of value is essentially completed. However, as also discussed above, it is desirable to create and maintain a transaction log to establish an audit trail to permit later verification of the transaction by a financial institution or other entity.

Figure 4:
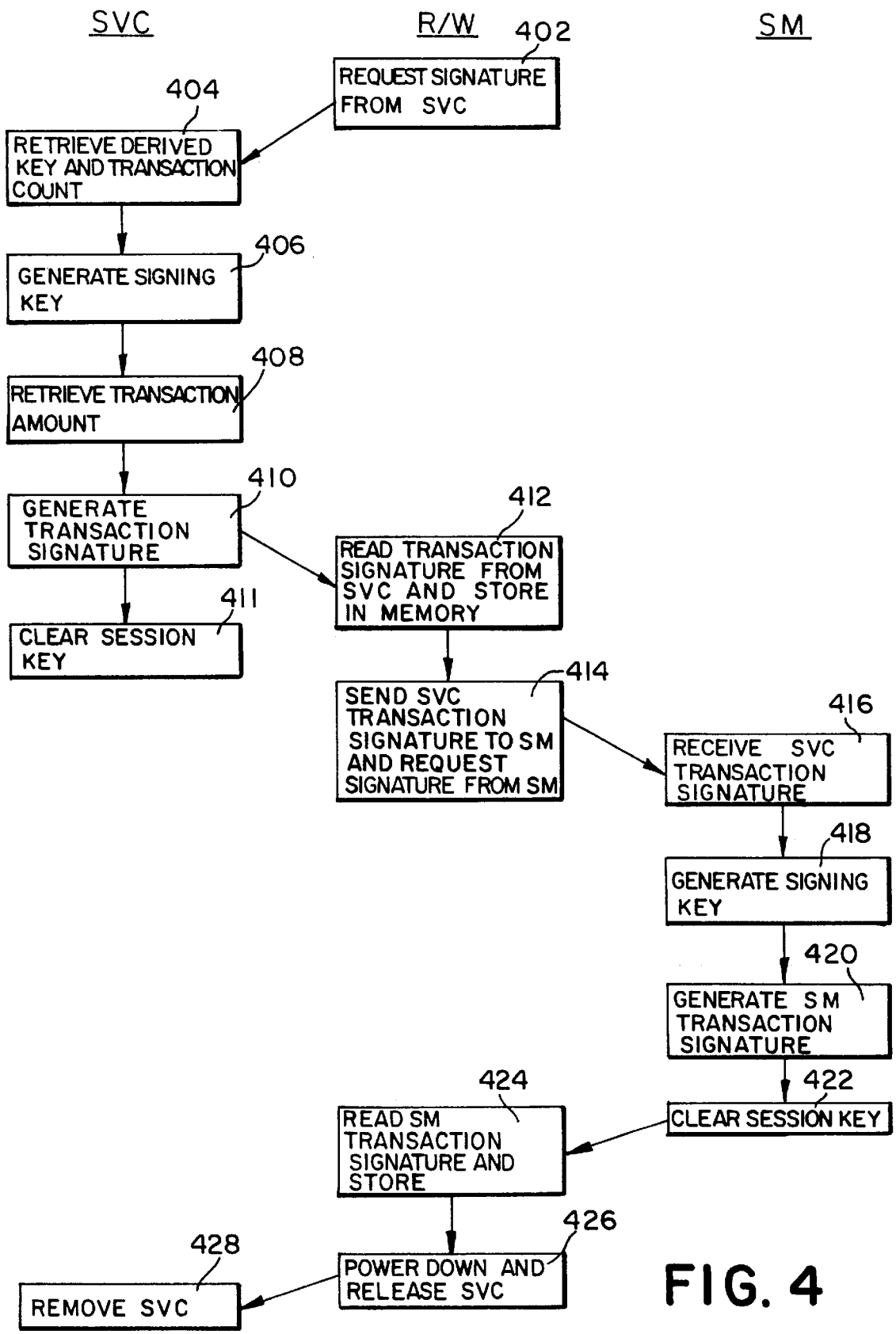
FIG. 4 is a flow diagram of a preferred method employed for establishing transaction verification signatures in accordance with the present invention.

FIG. 4 is a flow diagram of a preferred method for creating a transaction log as part of a financial or other transaction to establish an audit trail for later verification of a transaction between a SVC 20 and any type of terminal. Once an authorized transfer of value between the SVC 20 and the terminal has been completed as described above, the reader/writer requests a transaction signature from the SVC 20 at block 402. The SVC 20, upon receiving the request from the reader/writer, at block 404, retrieves from its memory a derived signature key. The derived signature key, in the present embodiment, was obtained by encrypting the identification number or serial number of the SVC 20 with a particular signature control key associated with the card issuer. Other types of signature keys may be used and more than one derived signature key may be stored in the SVC 20. The SVC also retrieves from its memory the SVC transaction count for the current financial or other transaction. At block 406, the SVC encrypts the current transaction count with the derived signature key using the DES algorithm to provide a signing key which is used only for the current session. The SVC then retrieves from its memory the transaction amount or the current transaction at block 408. At block 410, the SVC encrypts the retrieved transaction amount with the signing key from block 406 using the DES algorithm to generate the SVC transaction signature. The SVC clears the session key at block 411 thereby precluding any further financial or other transactions for the current session. All other session specific keys such as the signing key are also cleared.

At block 412, the reader/writer reads the transaction signature from the SVC and stores the SVC transaction signature in memory at a location which is indexed to the location at which the information pertaining to the transfer of value is stored. At block 414, the reader/writer sends the SVC transaction signature to the security module and requests a transaction signature from the security module.

At block 416, the security module receives the SVC transaction signature. At block 418, the security module generates a signing key. Like the SVC, the security module includes a transaction counter which is incremented by one when a transaction is conducted with the corresponding terminal. One of the keys stored within the memory of the security module is a derived signature key called an acquirer signature key. The signing key is obtained by encrypting the security module transaction count or number with the derived signature key using the DES algorithm.

At block 420, the security module generates the transaction signature by encrypting the transaction amount, the SVC transaction count, and at least a portion of the SVC transaction signature with the security module signing key from block 418 utilizing the DES encryption algorithm. At block 422, the security module clears the session key as well as any other session specific keys such as the signing key. At block 424, the reader/writer reads the transaction signature from the security module and stores the security module transaction signature at a memory location which is indexed to the location at which the information pertaining to the transfer of value is stored.

Finally, at block 426, the reader/writer powers down the SVC making sure that all data which is supposed to be maintained within the SVC is stored in non-volatile memory and following a standard power down procedure. Thereafter, the SVC is released by the SVC acceptor/holder 72 and, at block 428, a cardholder may remove the SVC from the card slot 48.

The SVC transaction signature as well as the security module transaction signature is maintained in the reader/writer memory 76 until such time as the information pertaining to the financial or other transaction is removed from the reader/writer memory 76 for further processing. By using the DES algorithm, the transaction signatures, the SVC and security module transaction counts and the signature keys, an auditor may verify that transaction amount deducted from the SVC corresponds to the transaction amount later credited to the account of the operator of the terminal (in the case of a purchase) and also corresponds to the transaction amount confirmed by the security module of the terminal. In this manner, verification of the value transferred to or from a SVC or to or from a terminal as part of the financial transaction can be verified and confirmed, if challenged, or during a normal audit review.

FIG. 5 is a more detailed functional schematic block diagram of a portion of a load value terminal 530 generally of the same type as the load value terminal 30 shown in FIG. 1. Like the POS terminal 40 shown in FIG. 2, the load value terminal 530 includes a reader/writer device 570 comprised of the hardware and software necessary to communicate with and to read from and write to a SVC 20, more particularly, the memory within the SVC integrated circuit 24. The reader/writer device 570 includes a SVC acceptor/holder 572, a reader/writer processor 574, and, in the present embodiment, its own memory 576. The structure and function of the SVC acceptor/holder 572, reader/writer processor 574, and memory 576, in the present embodiment, are essentially the same as the corresponding components (reference numerals 72, 74 and 76, respectively) of the POS terminal 40 shown in FIG. 2 and hereinbefore described in detail. Accordingly, a further description of the structure of the SVC acceptor/holder 572, the reader/writer processor 574, and the memory 576, and their respective functions, is not necessary for a complete understanding of the structure and operation of the load value terminal 530 and, therefore, will not be presented.

As with the POS terminal 40 of FIG. 2 the load value terminal 530 includes a slot 538 for receiving the SVC 20, the slot being positioned so that when the SVC 20 is inserted therein, the SVC 20 is in contact with the SVC acceptor/holder 572. The reader/writer device 570 also includes a security module 578 which, for purposes of the present description, will sometimes be referred to as security module 1 or SM1. The security module 578, in the present embodiment, is essentially the same, both in structure and function, as the security module 78 of the POS terminal 40 shown in FIG. 2 and described in detail above.

The load value terminal 530 also includes a terminal processor 531 which is in communication with a display device 532 and, in the present embodiment, a separate memory 533. As with the load value terminal 30 shown in FIG. 1, the display device 532 may be a cathode ray tube or any other type of display device employed for displaying information to a SVC cardholder. The load value terminal 530 also includes input means 535 for permitting a cardholder to input information to the load value terminal 530 and, more particularly, to the terminal processor 531. As with the load value terminal 30 discussed above, the input means could be any number of selection contacts or buttons, a numeric keypad, some type of on-screen or touch screen device, or any combination of the above. In the embodiment illustrated in FIG. 5, the load value terminal 30 also includes a currency receiver/reader 539 which is adapted to receive read and verify currency, for example, dollar bills, if used for loading value onto the SVC 20. The currency receiver/reader also communicates with the terminal processor 531.

Preferably, the load value terminal 530 is located within a relatively secure housing (not shown) and, possibly within a relatively secure area such as inside of a bank or other facility. Alternatively, the load value terminal 530 could be at some other location such as outside of a bank, convenience store or other facility so as to be available during hours when the bank, convenience store or other facility is not normally open. The precise structure and location of the load value terminal 530 as well as the particular method of operation of the preferred embodiment of the load value terminal 530 as hereinafter described should not be considered to be a limitation on the present invention.

The load value terminal 530 is in communication with a system 560 which cooperates with the load value terminal 530 in a manner which will hereinafter be described to authorize the loading of value onto a SVC 20. The authorization system 560 may be, for example, a complex computer system of a bank or other financial institution which functions primarily to maintain certain banking records, including account balances, account transactions, etc. The authorization system 560 could, in the alternative, be a separate computer system which may or may not, in turn, communicate directly with a larger computer system associated with a bank or other financial institution or, alternatively, may not directly communicate with such a larger computer but, instead, may be provided with parallel account information in sufficient detail to enable transactions to be authorized, the account information being periodically updated, i.e., once per day. The manner in which the load value terminal 530 communicates with the authorization system 560 depends upon where each is physically located. For example, a load value terminal 530 may be connected to an authorization system 560 using a standard communication system such as a commercial common carrier telephone or data link or by a single use or dedicated communication system such as an internal data link. It should be appreciated by those skilled in the art that the particular means by which the load value terminal 530 communicates with the authorization system 560 and the particular location of the load value terminal 530 with respect to the authorization system 560 should not be viewed as a limitation upon the present invention. All that is necessary is that the load value terminal 530 be positioned at a location accessible to one or more SVC cardholders and that the load value terminal 530 have the ability to communicate with an authorization system 560 for interaction in a manner which will hereinafter be described.

The authorization system 560 shown in FIG. 5 includes an authorization processor 562, a memory 564, and a security module 568 sometimes referred to as security module 2 or SM2. Whether or not the authorization system 560 is part of a larger computer system, the memory 564 includes software instructions for use by the authorization processor 562 for the processing of authorization requests and can also include various storage devices in which data reside. The memory 564, in the present embodiment, includes additional information including current account balance information for all accounts of applicable SVC cardholders of the associated financial institution. The security module 568 is similar to the security module 578 of the load value terminal 530. The security module 568, in addition to including the requisite verification keys, password keys, and the like, includes its own transaction counter which is incremented every time a transaction is performed, its own random number generator used for establishing a secure session with security module 1, its own hash control value for maintaining data from all transactions, etc. The security module 568 is employed for creating an authorization certificate for authorizing the transfer of value to the SVC 20. The authorization certificate is generated in a manner which will hereinafter be described and is verified by the SVC before value is loaded onto the SVC. Further details of the structure of the authorization device or system 560 are not necessary for a complete understanding of the present invention and, therefore, will not be presented.

Figure 6A:
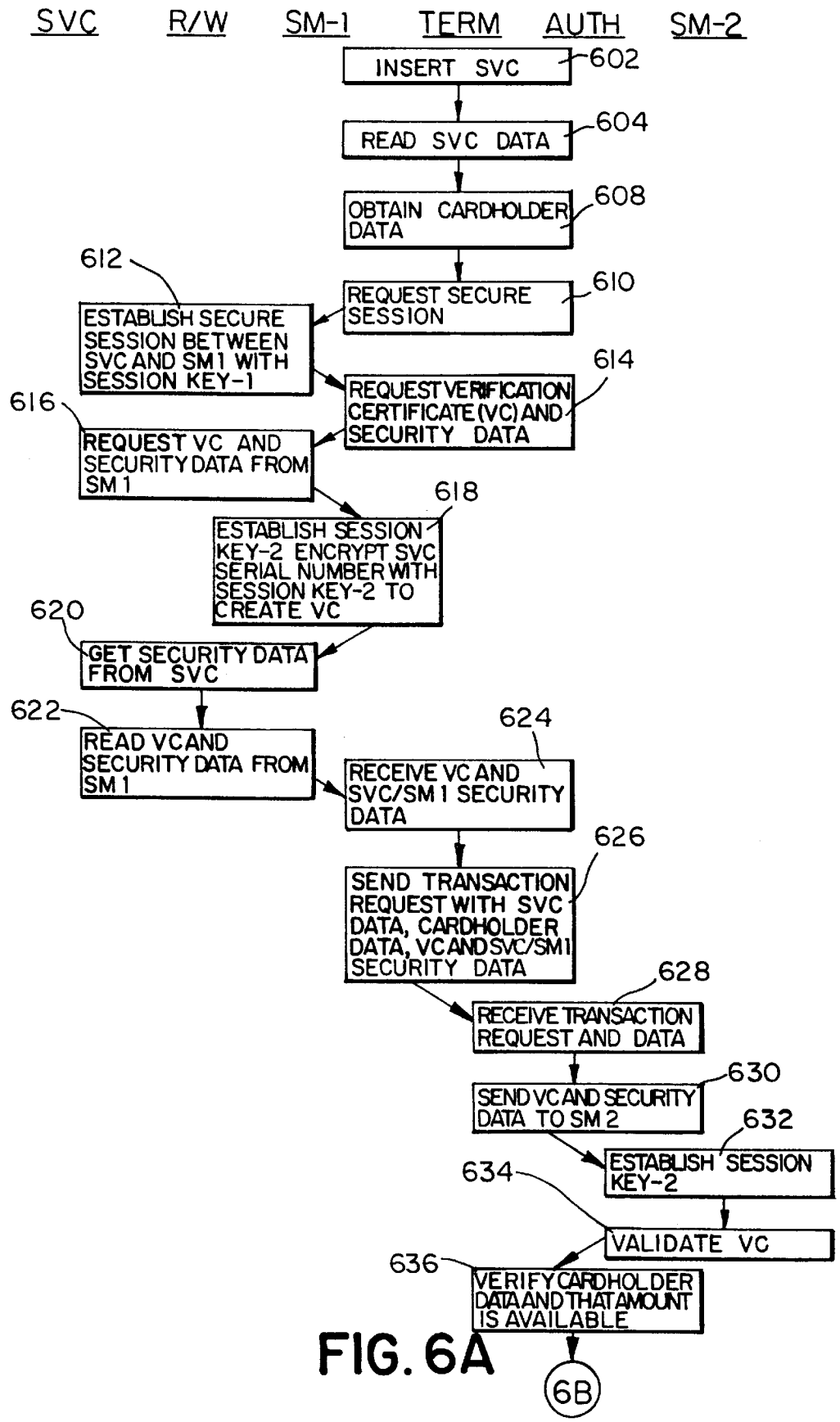
FIGS. 6A–6C are a flow diagram of a preferred method employed for loading value in accordance with the present invention.
Figure 6B:
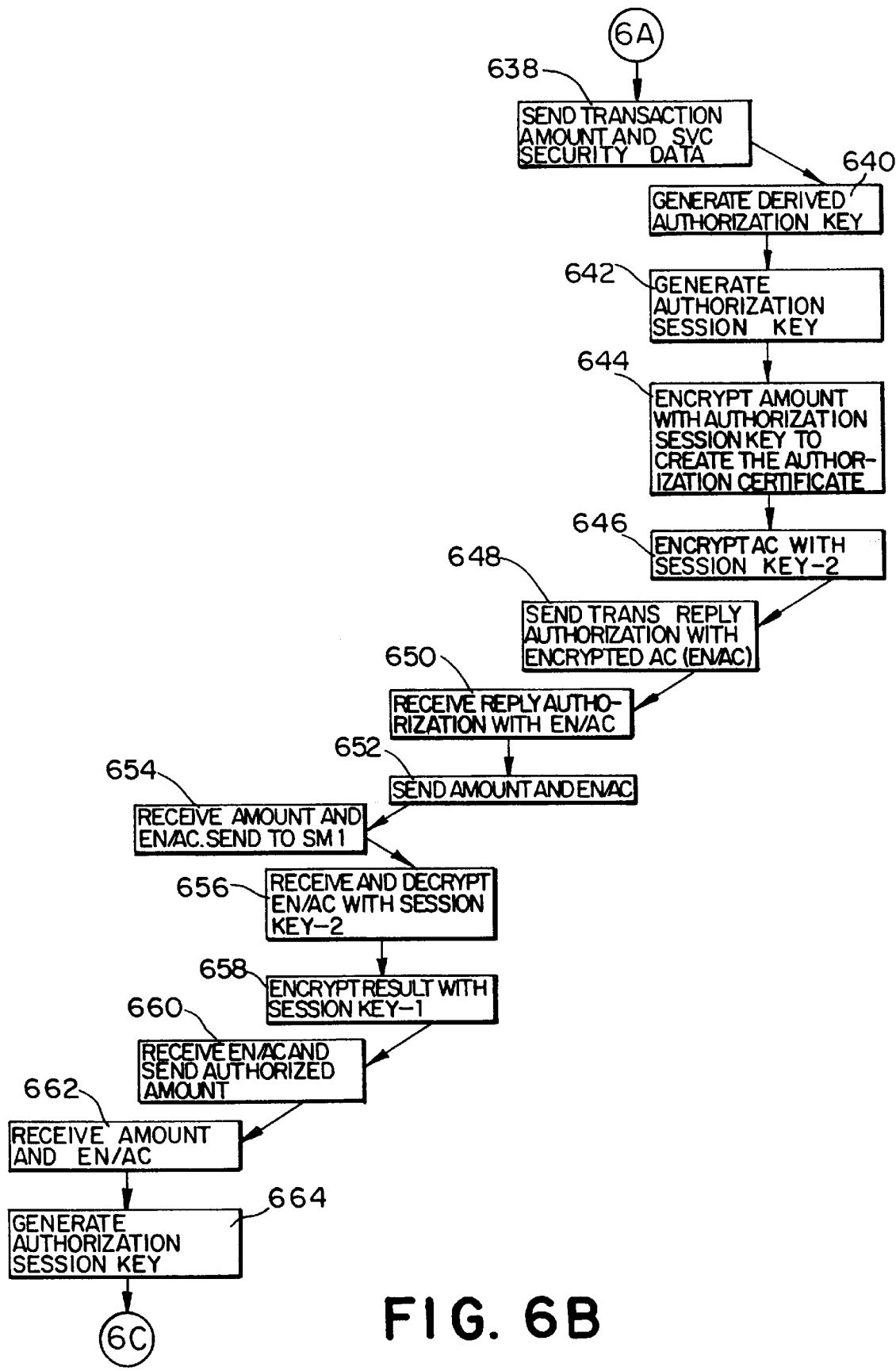
Figure 6C:
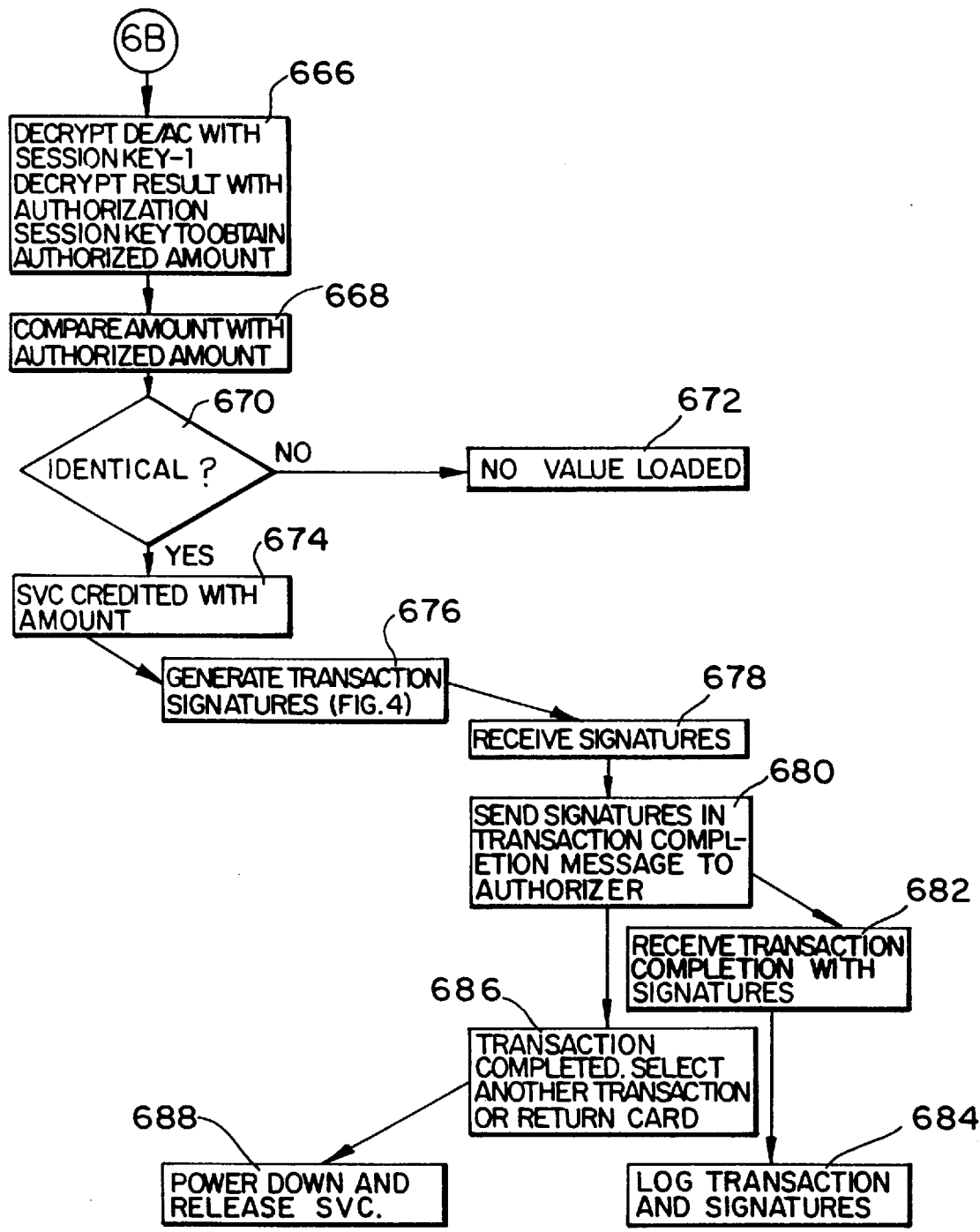

FIGS. 6A–6C together are a flow diagram of a preferred method for the performance of a transaction for loading value onto the SVC 20 using a load value terminal 530 of the type shown in FIG. 5. On FIGS. 6A–6C, activities which take place in the SVC 20 are shown in the leftmost column, activities which take place in the reader/writer microprocessor 574 (referred to as the reader/writer for brevity) are shown in the next column toward the right, activities which take place in the reader/writer security module 578 (referred to as SM1) are shown in the next column toward the right, activities which take place in the terminal processor 531 (referred to as the terminal) are shown in the next column toward the right, activities which take place in the authorization processor 562 are shown in the next column toward the right, and activities which take place in the authorization system security module 568 (referred to as SM2) are shown in the rightmost column. For the sake of brevity, the flow diagram set forth on FIGS. 6A–6C uses some abbreviations, the meanings of each of which are spelled out either in the flow diagram itself or in the following text.

Every load value transaction begins with the insertion of the SVC 20 into the card slot 538 where it is received by the SVC acceptor/holder 572 to establish a connection between the SVC acceptor/holder 572 and the integrated circuit 24 of the SVC 20 as shown at block 602. As with the purchase transaction described above in connection with FIGS. 3A and 3B, it should be understood that all of the steps described below actually take place between the various processors involved. For example, for the sake of brevity in the following text, interaction between the SVC 20 and the reader/writer 570 will be described. It should be understood by those skilled in the art that the terminology used is only for the sake of brevity in the description and that the actual transaction takes place between the processor of the integrated circuit 24 on the SVC 20 and the processor 574 or the reader/writer 570. Similar shorthand terminology is sometimes used with respect to the terminal processor 531 (sometimes called the terminal), the authorization processor 562 (sometimes called the authorization system), and the processor within the integrated circuit of security module 568 (sometimes called security module 2 or SM2). It should be clearly understood that such shorthand techniques for describing the processing and communications passing between the various devices should not be considered to be a limitation upon the present invention.

Once the connection, in the presently preferred embodiment a mechanical contact electrical connection, is established between the SVC 20 and the SVC acceptor/holder 572, the terminal, through the SVC acceptor/holder 572, reads certain data from the SVC 20 at block 604. In the presently preferred embodiment, the data which is read from the SVC 20 includes the identification number or serial number of the card. Other data can be obtained from the SVC memory or from an applicable magnetic stripe, if present, if desired.

After reading the SVC data, the terminal prompts the cardholder to enter certain cardholder data. In the presently preferred embodiment, the cardholder data which is entered includes the transaction type (i.e., load value from savings account or checking account), the amount of value to be loaded (generally in dollars), and the cardholder's PIN. The cardholder data is obtained at blocks 608 using the display 532 to display prompts to the cardholder and using the input means 535 for the cardholder to enter the data.

Once the SVC data and the cardholder data have been obtained by the terminal, at block 610, the terminal requests the reader/writer to initiate the establishment of a secure session between the SVC 20 and the reader/writer security module 578 (SM1). At block 612, the reader/writer, in cooperation with the SVC 20 and SM1 578, establishes a secure session substantially in the manner described above and illustrated by the flow diagram of FIGS. 3A and 3B. The establishment of the secure session between the SVC and SM1 results in the generation of a common SVC/SM1 session key (hereinafter referred to as "session key-1"), which is then used for subsequent transactions which take place between the SVC 20 and the reader/writer 570 in substantially the same manner as described above in connection with the POS terminal 40 (FIG. 2). Of course, as previously discussed, the establishment of a secure session confirms the validity of the SVC 20 and confirms to the SVC 20 the validity of the terminal 530.

Once the secure session has been established between the SVC 20 and SM1, the terminal, at block 614, requests the reader/writer to provide a verification certificate (VC) as well as certain security data. At block 616, the reader/writer requests the verification certificate from SM1 as well as certain security data from SM1. The security data requested and obtained from the SVC, in the present embodiment, includes the SVC issuer's identification number, the SVC transaction count, the SVC identification number or serial number, a SVC key number, a SVC funds tool identification, and a SVC application identification. In the presently preferred embodiment, the verification certificate is generated by SM1 encrypting the issuer's serial number with a second session key (referred to as session key-2) that is shared by SM1 and SM2. At block 618, SM1 establishes session key-2 by encrypting the SM1 transaction number with a derived verification key retrieved from its memory using the DES algorithm. Other methods may be employed for generating an appropriate verification certificate.

At block 620, the reader/writer obtains security data from SM1. In the present embodiment, the security data which the reader/writer obtains from SM1 includes the identification number or serial number of SM1, the transaction count or number of SM1, a SM1 key number, and a SM1 verification key number. It will be appreciated by those skilled in the art that while the SVC security data and SM1 security data described above is used in connection with the presently preferred embodiment, other types of security data may be used in a particular application. For example, in some embodiments, only a single SVC application may be used and so the SVC application identification data may not be necessary. Similarly, the SVC 20 may contain multiple purses and the identification of a specific purse for loading value would be included in the SVC security data received.

The verification certificate and the SVC and SM1 security data are provided to the terminal at block 24. At this point in the process, the terminal has obtained from the SVC and the cardholder, as well as its own associated components, all of the information necessary to proceed with the processing of the requested value transfer transaction. For the purposes of illustrating the present embodiment, the requested transaction is for the load value terminal 530 to load a cardholder selected cash value onto the SVC 20 from a designated account of the cardholder at the financial institution which issued the SVC 20 to the cardholder. While the load value terminal 530 now has all of the information necessary to complete the transaction, the load value terminal 530 does not complete the transaction without receiving authorization from the applicable financial institution. Such authorization is obtained from the authorization system 560 (FIG. 5) in a manner which will hereinafter be described.

At block 626, the terminal sends a transaction request to the authorization system 560 along with certain SVC data, cardholder data, SVC and SM1 security data, and the verification certificate. At block 628, the authorization system 560 receives the transaction request and all of the above-described transmitted data. The authorization system then sends the verification certificate and the SVC and SM1 security data to the second security module (SM2) 568 at block 630. At block 632, SM2, using the security data and in particular the SM1 transaction number encrypted by the derived verification key using the DES algorithm establishes the SM2 session key-2. Session key-2 is thereafter used for verification purposes between SM2 and SM1 in the same manner that session key-1 is used for verification purposes between SM1 and the SVC. At block 634, SM2 validates the verification certificate by encrypting the SVC serial number with its session key-2 and comparing the result with the received verification certificate. If the comparison is positive (i.e., the received verification certificate is identical to the SVC serial number encrypted with the SM2 session key-2), then the SM1 session key-2 is identical to the SM2 session key-2 thus validating the terminal 530.

The authorization system at block 636 verifies the authenticity of the cardholder data (card number, PIN, and account number) and verifies that the requested transaction amount is available in the identified cardholder account. The verifications are accomplished using account data and other data in the memory 564 of the authorization system 560 or from some other source available to the authorization system 560. If the validity of the card cannot be verified or if the PIN cannot be verified using a standard PIN authorization process, or it the account number is incorrect or if the dollar value available in the identified account is insufficient to meet the requested transaction amount, the requested transaction is rejected. If the authorization system 560 is able to complete all verifications, then, at block 638, the authorization system sends the requested and now approved transaction amount and the SVC security data to SM2.

SM2 receives the data from the authorization system and generates an authorization certificate (AC). First, a derived authorization key is generated by SM2 by encrypting the SVC serial number with a stored SM2 authorization key at block 640. At block 642, SM2 generates an authorization session key by encrypting the SVC transaction count with the derived authorization key using the DES algorithm. The authorization certificate is generated at block 644 by encrypting the transaction amount, and if applicable, purse locations with the authorization session key using the DES algorithm. Alternatively, other parameters could be used for generating the authorization certificate and/or some other type of encryption algorithm could be employed. At block 646, the authorization certificate generated in block 634 is encrypted by SM2 with the previously established session key-2, again using the DES encryption algorithm. The encrypted authorization certificate is provided to the authorization system 560 and, at block 648, the authorization system sends the encrypted authorization certificate and a transaction approval reply signal to the terminal.

The terminal receives the transaction approval reply and the encrypted authorization certificate at block 650 and, at block 652, sends the approved amount and the encrypted authorization certificate to the reader/writer 570. The reader/writer receives the approved transaction amount and the encrypted authorization certificate at block 654 and sends both to SM1 receives the approved transaction amount and the encrypted authorization certificate at block 656. Thereafter, SM1, utilizing session key-2 decrypts the received encrypted authorization certificate. At block 658, SM1 re-encrypts the authorization certificate using session key-1 and sends the re-encrypted result to the reader/writer.

The reader/writer receives the re-encrypted (with session key-1) authorization certificate and sends the re-encrypted authorization certificate along with the authorized amount to the SVC at block 660. The SVC receives the authorized amount and the re-encrypted authorization certificate at block 662. At block 664, the SVC generates its own SVC authorization session key using data stored within the SVC. Thereafter, at block 666, the SVC decrypts the received encrypted authorization certificate using session key-1 and the DES algorithm. The result is then decrypted with the generated SVC authorization session key to obtain the authorized amount. The SVC then compares the authorized amount from block 666 with the received authorized amount (block 662) at block 668. If the comparison shows that the two are not identical at block 670, then no value is loaded onto the SVC (at block 672) and the transaction is rejected. If the result of the comparison shows that the two are identical, the SVC is credited with the authorized transaction amount at block 674 thereby effectively completing the requested transfer or value from the cardholder's account to the SVC.

After the value has been transferred to the SVC, the reader/writer at block 676 obtains transaction signatures from the SVC and SM1. The SVC generates a transaction signature which is then sent to the reader/writer. The transaction signature generated by the SVC is essentially the same as the transaction signature described above with respect to FIG. 4 and, therefore, the description of the transaction signature process need not be repeated. The reader/writer receives and stores the transaction signature from the SVC. The reader/writer also requests and obtains a transaction signature from SM1 which is also stored. The reader/writer sends both the SVC transaction signature and the SM1 transaction signature to the terminal 530. The terminal receives both transaction signatures at block 678 and sends both transaction signatures to the authorization system 560 as part of a transaction completion message at block 680.

At block 682, the authorization system receives the transaction completion message including the SVC transaction signature and SM1 transaction signature. At block 684, the authorization system logs the transaction, the SVC transaction signature and SM1 transaction signature for settlement purposes. At block 686, the terminal processing of the transaction is complete. The terminal may allow the cardholder to select another value transfer or may return the SVC to the cardholder. Upon receiving a transaction completed signal at block 688, the reader/writer powers down the SVC in the manner described above and releases the SVC from the SVC acceptor/holder 572 for removal by the cardholder.

FIGS. 6A–6C illustrates a preferred method for loading value onto a SVC 20 utilizing the load value terminal 530 based upon a corresponding debit to an account of the cardholder with a financial institution or other entity which, preferably, issued the SVC 20 to the cardholder. As discussed briefly above, methods may be employed for transferring value from the account of the cardholder to the SVC which differ from the method shown in FIGS. 6A–6C and described above. In addition, as also discussed briefly above, it is possible For a cardholder to transfer value to a SVC 20 using the load value terminal 530 and cash or currency. In such a method, the cardholder inserts one or more bills into the currency receiver/reader 539 through an appropriate slot on the load value terminal 530. The currency receiver/reader reads and validates each received bill, determines the face amount of each sill, and the total dollar amount which has been received. The total dollar amount is then sent to the terminal processor 531. The terminal processor 531 in turn sends the received dollar amount to an authorization processor along with the same SVC and SM1 security data described above. The authorization processor creates an authorization certificate in the same manner discussed above, but without the need to verify the amount available in the cardholder's account, and the remainder of the processing continues in accordance with the flow diagram of FIGS. 6A–6C. Of course, other methods may be employed for loading value from currency onto the SVC 20, if desired.

From the foregoing description, it can be seen that the present invention comprises a method and apparatus for use in a transaction system for integrated circuit cards. It will be appreciated by those skilled in the art that changes could be made to the embodiment described above without departing from the broad inventive concept thereof. It is understood, therefore, that this invention is not limited to the particular embodiment disclosed, but it is intended to cover all modifications within the spirit and scope of the present invention as defined by the appended claims.

We claim:

1. A transaction system comprising:
   a first transportable integrated circuit (IC) device including a processor, memory, data stored in the memory and an operating program stored in the memory, the data stored in the memory of the first IC device including stored value data representative of an amount of transferable cash-equivalent value;
   a terminal including a reader/writer device, a processor, memory and an operating program stored in the memory, the reader/writer device including means for establishing communication with the first IC device whereby the processor of the first IC device is in communication with the terminal processor, the terminal including means for transferring cash-equivalent value between the first IC devices and the terminal such that the stored value data of the first IC device is adjusted to reflect the transferred value and such that data representative of the transfer including the transferred value is written to the memory of the terminal; and
   a security device including a processor, memory, data stored in the memory and an operating program stored in the memory, the security device communicating with the terminal so that the processor of the security device communicates with the terminal processor whereby upon establishing communication with the first IC device, the terminal processor initiates and controls a series of operations by the security device processor utilizing the data and the operating program stored in the security device memory and data received from the first IC device for verification by the security device of the validity of the first IC device.

2. The transaction system as recited in claim 1 wherein the terminal processor initiates and controls a series of operations by the first IC device processor utilizing the data and operating program stored in the first IC device memory and data received from the security device for verification by the first IC device of the validity of the security device and the terminal for enabling the conducting of a transaction between the first IC device and the terminal.

3. The transaction system as recited in claim 2 wherein the transaction between the first IC device and the terminal is the loading of value into the memory of the first IC device and a corresponding debiting of value from an account of the holder of the IC device at a financial institution, the financial institution including an authorization system for authorizing a transfer of value from the account of the holder of the first IC device and wherein the terminal further includes means for communicating with the authorization system.

4. The transaction system as recited in claim 3 wherein the terminal comprises a modified automated teller machine.

5. The transaction system as recited in claim 2 wherein the transaction between the first IC and the terminal is the loading of value into the memory of the first IC device corresponding to cash inserted into the terminal by the holder of the first IC device and wherein the terminal further includes means for receiving and verifying the validity of the cash inserted into the terminal.

6. The transaction system as recited in claim 5 wherein the terminal comprises a modified automated teller machine.

7. The transaction system as recited in claim 2 wherein the transaction between the first IC device and the terminal comprises transferring value from the first IC device to the terminal, the terminal further including means for establishing the amount of value to be transferred from the first IC device to the terminal.

8. The transaction system as recited in claim 7 wherein the means for establishing the amount of value to be transferred comprises a point of sale device.

9. The transaction system as recited in claim 8 wherein the point of sale device comprises an electronic cash register.

10. The transaction system as recited in claim 7 wherein the means for establishing the amount of value to be transferred comprises a vending apparatus.

11. The transaction system as recited in claim 2 wherein the first IC device comprises a card.

12. The transaction system as recited in claim 2 wherein the terminal comprises an automated teller machine.

13. The transaction system as recited in claim 2 wherein the security device is located within the terminal.

14. The transaction system as recited in claim 2 wherein the security device is at a location remote from the terminal.

15. The transaction system as recited in claim 2 wherein the reader/writer device comprises an acceptor/holder for engaging the first IC device and for establishing communication with the first IC device, the acceptor/holder communicating with the processor.

16. The transaction system as recited in claim 2 wherein the terminal further comprises a terminal application module for establishing communication between the processor and other portions of the terminal employed for establishing value to be transferred from the first IC device to the terminal.

17. The transaction system as recited in claim 1 wherein the security device is a second IC device.

18. The transaction system as recited in claim 1 wherein the security device does not include stored value data representation of an amount of transferable cash-equivalent value.

* * * * *